(12) United States Patent
Lieberman et al.

(10) Patent No.: US 7,581,038 B1
(45) Date of Patent: Aug. 25, 2009

(54) MULTICAST DISTRIBUTION OVER ONE OR MORE ADDRESSABLE BUSES WHEREIN A SWITCH INCLUDES A REMAPPING TABLE FOR INPUTTING ADDRESS FOR ONE OR MORE DESTINATIONS

(75) Inventors: Noam Lieberman, Ramat-Gan (IL); Nathan Bourshtein, Netanya (IL); Shlomi Ozalvo, Gany-Tikva (IL); Rafi Sity, Kfar-Saba (IL)

(73) Assignee: Polycom, Inc., Pleasanton, CA (US)

( * ) Notice: Subject to any disclaimer, the term of this patent is extended or adjusted under 35 U.S.C. 154(b) by 256 days.

(21) Appl. No.: 11/378,797

(22) Filed: Mar. 16, 2006

(51) Int. Cl.
*G06F 13/00* (2006.01)
*G06F 3/00* (2006.01)

(52) U.S. Cl. .................. 710/9; 710/8; 710/10; 710/33; 709/200; 709/227

(58) Field of Classification Search .................. 710/8, 710/10, 33; 709/200, 227
See application file for complete search history.

(56) References Cited

U.S. PATENT DOCUMENTS

| | | | |
|---|---|---|---|
| 6,300,973 B1 | 10/2001 | Feder et al. | 348/14.09 |
| 6,496,216 B2 | 12/2002 | Feder et al. | 348/14.09 |
| 6,724,761 B1 | 4/2004 | Moy-Yee et al. | 370/390 |
| 6,757,005 B1 | 6/2004 | Elbaz et al. | 348/14.09 |
| 6,771,601 B1 * | 8/2004 | Aydemir et al. | 370/231 |
| 7,007,098 B1 * | 2/2006 | Smyth et al. | 709/233 |
| 2002/0159394 A1 | 10/2002 | Decker et al. | 370/252 |
| 2002/0188731 A1 | 12/2002 | Potekhin et al. | 709/227 |
| 2003/0103468 A1 | 6/2003 | Seavers et al. | 370/260 |
| 2003/0174202 A1 | 9/2003 | Eshkoli et al. | 348/14.08 |
| 2004/0042553 A1 | 3/2004 | Elbaz et al. | 375/240.25 |
| 2005/0058088 A1 | 3/2005 | Decker et al. | 370/260 |
| 2005/0091380 A1 | 4/2005 | Gonen et al. | 709/227 |
| 2005/0157164 A1 | 7/2005 | Eshkoli et al. | 348/14.07 |

FOREIGN PATENT DOCUMENTS

| | | |
|---|---|---|
| WO | WO 96/38959 | 5/1996 |
| WO | WO 02/060126 | 8/2002 |
| WO | WO 2005/004481 | 1/2005 |

OTHER PUBLICATIONS

U.S. Appl. No. 09/708,898, filed Nov. 8, 2000, Even, et al.
U.S. Appl. No. 09/852,438, filed May 9, 2001, Even et al.
U.S. Appl. No. 11/109,563, filed Apr. 19, 2005, Eshel, et al.
RapidIO™ Interconnect specification Part 11: Multicast Extensions Specification; Rev. 1.3.1, Feb. 2005.

* cited by examiner

*Primary Examiner*—Tammara Peyton
(74) *Attorney, Agent, or Firm*—Wong, Cabello, Lutsch, Rutherford & Brucculeri, LLP

(57) ABSTRACT

Disclosed herein is a method for multicasting data to a plurality of destinations over an addressable bus using a switch adapted to receive a stream of data cells from a data source. The switch is adapted to determine the appropriate recipients of the data using a stream identifier associated with the data cells, replicate the data for each destination, and send the replicated data to each destination. The data source need not be aware of the recipient of the data stream because the recipient is determined by the switch. The stream from the data source can be sent to a different set of recipients by associating the new recipients with the stream identifier. This method is useful for applications such as videoconferencing, in which groups of recipients of a particular data stream change often.

21 Claims, 4 Drawing Sheets

MULTICAST DISTRIBUTION OVER ONE OR MORE ADDRESSABLE BUSES WHEREIN A SWITCH INCLUDES A REMAPPING TABLE FOR INPUTTING ADDRESS FOR ONE OR MORE DESTINATIONS

FIELD OF THE INVENTION

The present disclosure relates to the field of data transfer, and specifically to the field of transmitting cells of data through a switch from a source to a plurality of destinations.

BACKGROUND

A common architecture of a computerized device includes one or more input/output ports, one or more electronic boards (cards), and one or more local buses. The one or more local buses can be used as backplanes for connecting the plurality of boards among themselves and with the input/output ports. Generally, some boards may have one or more of their own local buses for connecting integrated circuits on the card between themselves and an external port of the board. Exemplary integrated circuits include microprocessors, Digital Signal Processors (DSP), FPGA, ASIC, etc. As used herein, the terms "DSP", "integrated circuits", "computing devices", "microprocessor", "ASIC" and "FPGA" can be interchangeable. For example, the term 'DSP' may be used as a representative term for any of the above group. On some boards, one or more local buses may transfer data directly, or almost directly, to/from the DSPs themselves. As used herein, the term bus refers to any type of communication link between devices. A bus can be a point to point connection, a multipoint to multipoint, a network, etc.

Several types of technologies can be used for implementing buses. One common method is using a Time Division Multiplex (TDM), in which each element on the bus has a time slot on which the element can transmit its data. An alternate mode is using an addressable bus in which sending the information is done in cells, also known as packets, burst, transaction, chunk of data, etc. As used herein, the term 'cell' refers to any of the above group.

In addressable bus architecture, each element on the bus has its own address. Each cell has a header and a payload. Usually the header includes at least a destination address to which the cell is targeted and the payload includes the transmitted data. Only an element that is associated with the destination address can retrieve the cell from the local bus. Exemplary addressable buses include Peripheral Component Interconnect (PCI) bus, PCI extended (PCI-X), and Industry Standard Architecture bus (ISA).

The efficiency of an addressable bus is higher than TDM buses. Therefore, more and more DSPs are using addressable buses. However, common addressable buses may have some inefficiency affecting certain applications. One of the drawbacks of an addressable bus is the inability to transmit a cell in a multicast mode to a group of destination devices. In a conventional addressable bus, a cell that has to be transmitted to a group of elements (multicast) is transmitted once for each destination in the group. Accordingly, system efficiencies are lost because system resources are used to continuously transmit the same cell of data.

Some prior art methods have been proposed for overcoming the inefficiency of multicasting over an addressable bus by using a multicast address as a destination address and a switch having a translating table for translating the multicast address to the relevant group of addresses. The switch replicates the received data (the payload) and transmits it to the group of addresses. However, these methods are difficult to manage because both the source of the cell and the switch must be familiar with the multicast addresses. When the multicast group changes, updating the multicast addresses at both the sources and switches is complicated to manage. Such a solution is not suited to applications that have frequent changes in multicast groups during an ongoing session such as multimedia multipoint conferences, in which speakers frequently change. In addition, in such applications certain streams of data can be distributed to more than one multicast group or some destinations may belong to two or more multicast groups. Therefore, managing associations and changes in the associations between multicast address and the private addresses of each element in the group is complicated.

Additionally, each DSP may run two or more processes (logical modules) in parallel. Usually each process may be identified by associating it with a certain address or a space of addresses in the internal memory of the DSP. Consequently, although a DSP is a single element on the bus, the DSP may have more than one address.

Furthermore, there are applications in which a size of a cell is smaller than the size of a data frame that has to be transferred between two nodes and thus the data frame must be transmitted in two or more cells. Ideally, the data frame is transmitted in consecutive cells to simplify the reconstruction of the data frame at the receiver end (in a relevant addresses space of a memory of a DSP, for example). In audio or video application, for example, a common frame of data that is transferred over a local bus can be bigger than a cell. Due to the standards of the local bus, the bus may be switched from one source of data to another source before all of the cells carrying an entire data frame from the first source can be transmitted. In case that the other source of data transmits a cell to the same destination, the data frame from the first source may be received non-sequentially, which may create problems in resuming the frame.

Accordingly, there is a need in the art for more efficient processes for transmitting multicast cells over an addressable bus wherein multicast groups frequently change during a session. Ideally, the process should be easy to manage and adapted to carry streams of data that are bigger than a common cell. Such a method would be ideally suited for multimedia multipoint conferencing systems, among other applications.

SUMMARY

A system and method are disclosed for multicasting data over an addressable local bus such as a PCI bus, PCI-X bus, ISA, etc. A switch is added between two or more local buses such that each local bus can connect one or more computing devices to a port in the switch. The sources of data include computing devices and/or processes (logical modules) running on the computing devices. Each source of data may place a cell of data over the local bus according to the communication protocol used over the local bus. A logical module can be a task running in a DSP that receives data, performs certain functions with the data, and transfers the processed data to one or more other logical modules. For example, in a multimedia multipoint control unit (MCU) a logical module can be a video decoder that decodes compressed video streams coming form one or more associated endpoints.

A stream identifier (stream ID) can be assigned to each logical stream. The stream ID can be session dependent. A stream ID can also be assigned to a command or a status coming from a certain logical module. Stream IDs can be assigned by a controller that controls the allocation of resources needed for particular sessions. In the context of a video conference, a controller adapted to allocate resources assigned to a videoconferencing session according to the needs of the session can assign stream IDs according to the specific requirements of a particular videoconferencing session. Therefore during a particular session a given DSP may deliver streams with one set of IDs and in another session the same DSP may deliver streams with another set of IDs. Alternatively, each DSP may have a constant group of stream IDs that can be used by the DSP. Still alternatively, a DSP may have some constant stream IDs and some stream IDs that are assigned according to the needs of a particular session.

Each logical module that delivers a logical stream is aware of its associated stream ID but is not aware of the destination of the stream. The switch gets information that ties each one of the stream IDs to a destination address or to a group of destination addresses to which the stream has to be distributed. For example, the switch may have a remapping table. Each entry in the remapping table can be associated with a stream ID and includes one or more destination addresses to which the stream ID is to be distributed. The switch can be adapted to receive cells having stream IDs or alternatively to receive all the cells coming from different sources, retrieve the stream IDs, search the remapping table for one or more destination addresses, and to send the payload of the cell to the one or more destination addresses. A destination address of the switch can be an inputting address of a targeted logical module in which a received payload is written.

Changes in a session can be managed in several ways. For example in a conferencing session, stream IDs can be associated to a session and a change in the session may be followed by transferring one or more relevant stream IDs from one or more sources of data to others. For example, a stream ID can be assigned to a decoded audio stream coming from a speaker conferee. This stream ID can be allocated to a decoder module that has been assigned to a conferee that is currently speaking. If a speaker is changed the decoder module of the old speaker may be muted and its associated stream ID can be transferred to another decoder module that is associated with a new conferee. Thus, neither the remapping table nor the destination modules are aware of the change and the only adaptation that is needed is muting the old modules and transferring the relevant stream IDs from the old ones to the new modules.

Alternatively, the change can be implemented in the remapping table of the switch. The stream IDs allocated to the decoded audio and decoded video streams of the old conferee are replaced by the stream IDs of the decoded audio and the decoded video streams of the new speaker. Still alternatively, a combination of both methods, i.e., changing the stream ID or changing the remapping table, can be used depending on the modification that is needed.

During initiation of the electronic device as well as initiation of new sessions, each logical module may be assigned with an inputting address, or a space of consecutive inputting addresses. Those inputting addresses are used by the switch as destination addresses in order to push the appropriate cells toward the appropriate logical modules. In addition each logical module is assigned with one or more streams ID. Each stream ID is associated with one of the streams or status or information created and sent by this logical module over the bus toward the switch. Consequently, a certain logical module may be associated with two or more streams ID as well as two or more inputting addresses.

BRIEF DESCRIPTION OF THE DRAWINGS

Exemplary embodiments will be more readily understood from reading the following description and by reference to the accompanying drawings, in which.

DETAILED DESCRIPTION

Figure 1:
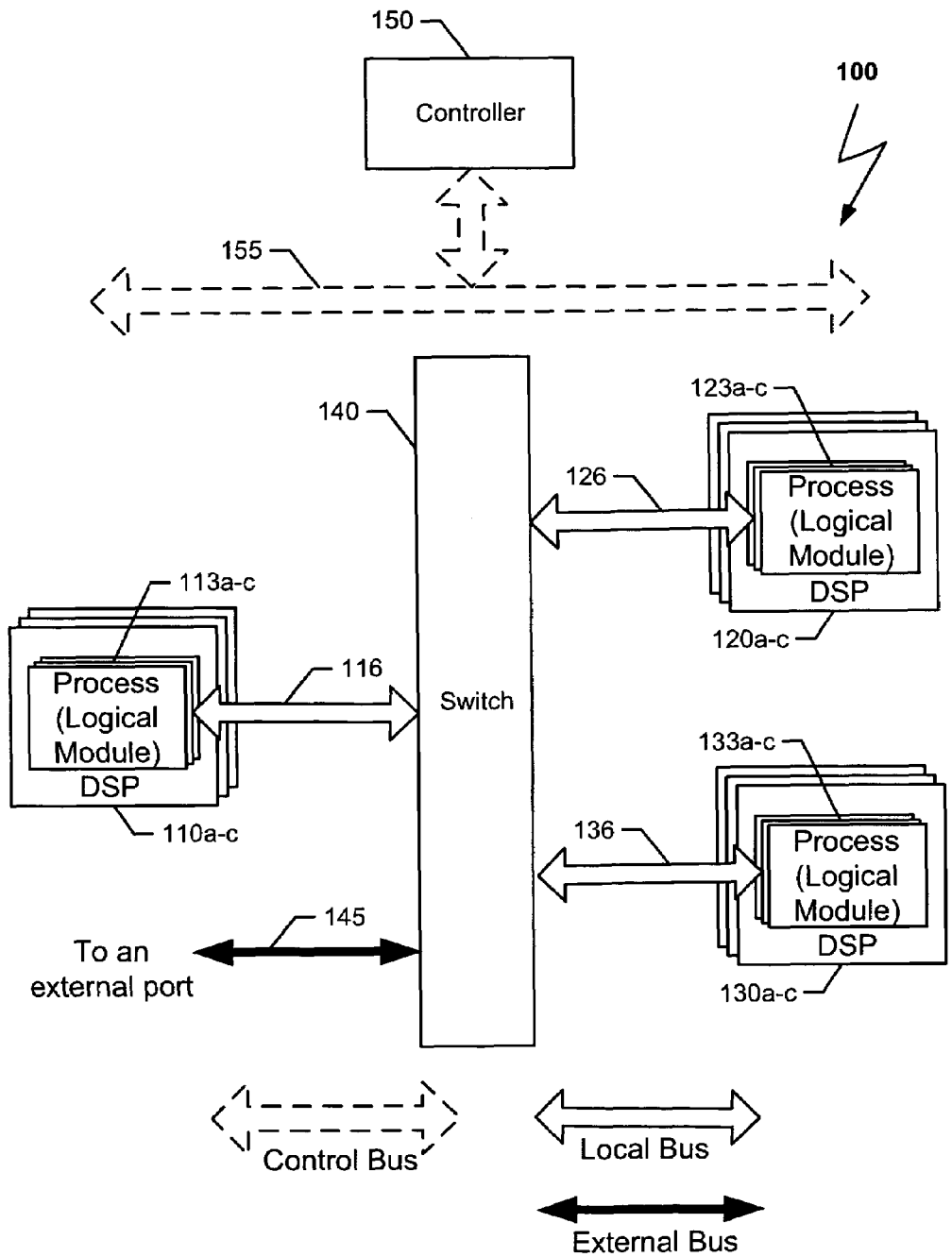
FIG. 1 schematically illustrates a simplified block diagram with relevant elements of an exemplary electronic device having a plurality of DSPs.

As stated above, a system and method are disclosed for multicasting over an addressable local bus such as a PCI bus, PCI-X bus, ISA, etc. A switch may be added between two or more local buses. Each bus connects one or more computing devices to a port in the switch. The sources of data include computing devices and/or processes (logical modules) running on the computing devices. Each source of data may place a cell of data over the local bus according to the communication protocol used over the local bus. A logical module can be a task running in a DSP that receives data, performs certain functions with the data, and transfers the processed data to one or more other logical modules. For example, in a multimedia multipoint control unit (MCU) a logical module can be a video decoder that decodes compressed video streams coming form one or more associated endpoints.

A given DSP may have a plurality of logical modules. Each logical module may receive and create one or more logical streams. In the above example of an MCU each video decoder may receive a compressed (encoded) video stream and deliver decoded video stream. Each one of those streams can be defined as a logical stream. Exemplary logical streams can be a compressed video stream that was received from a certain endpoint; a compressed audio stream that was received from a certain endpoint; a decoded audio stream that was received from a certain endpoint via its associated audio decoder logical module; a decoded video stream that was received from a certain endpoint via an associated video decoder logical module; a compressed mixed audio stream that has to be distributed to several endpoints; a compressed composed video stream that has to be distributed to several endpoints; etc. Furthermore, commands and controls can also be defined as logical streams. A DSP on a local bus that implements a plurality of video decoder logical modules may receive a plurality of compressed video streams and commands and deliver a plurality of decoded video streams and status information, etc.

A stream ID can be assigned to each logical stream. The stream ID can be session dependent. A stream ID can also be assigned to commands or statuses coming from a certain logical module. Stream IDs can be assigned by a controller that controls the allocation of resources needed for particular sessions. In the context of a video conference, a controller adapted to allocate resources assigned to a videoconferencing session according to the needs of the session can assign stream IDs according to the specific requirements of a particular videoconferencing session. Therefore during a particular session a given DSP may deliver streams with one set of IDs and in another session the same DSP may deliver streams with another set of IDs. Alternatively, each DSP may have a constant group of stream IDs that can be used by the DSP. Still alternatively, a DSP may have some constant stream IDs and some stream IDs that are assigned according to the needs of a particular session.

An endpoint is a terminal on a network, capable of providing real-time, two-way audio/visual/data communication with other terminals or a multipoint control unit (MCU). An endpoint may provide speech only; speech and video; or speech, data and video communications. Exemplary endpoints include Polycom VSX 7000, (Polycom, Inc.). An MCU is a conference controlling entity located in a node of the network or in a terminal, which receives several media channels from access ports. An MCU processes audio/visual and data signals according to certain criteria and distributes them to the connected channels. Examples of MCUs include the MGC-100, (Polycom Inc.).

Each logical module that delivers a logical stream is aware of its associated stream ID but is not aware of the destination of the stream. The switch gets information that ties each one of the stream IDs to a destination address or to a group of destination addresses to which the stream has to be distributed. For example, the switch may have a remapping table. Each entry in the remapping table can be associated with a stream ID and includes one or more destination addresses to which the stream ID is to be distributed. The switch can be adapted to receive cells having a stream IDs or alternatively to receive all the cells coming from different sources, retrieve the stream IDs, search the remapping table for one or more destination addresses, and to send the payload of the cell to the one or more destination addresses. A destination address of the switch can be an inputting address of a targeted logical module in which a received payload is written.

When a logical module has a new frame of data to send, for example, when a new decoded video frame is ready, the associated stream ID is added as identifier of the stream. The data (the decoded video frame, for example) as well as the stream ID are then transferred to a local bus interface. The local bus interface can be an internal module of the same DSP that owns the source of the data. The local bus interface may manipulate the frame of data and the stream ID according to the protocol of the local bus. The data frame may be divided into a plurality of cells (packets). The stream ID can be added as an address of each cell and one or more cells can be placed on the local bus according to the protocol of the bus. The cells can be sent one after the other or one or more breaks may occur in between consecutive cells. During such a break, cells that belong to other streams can be sent over the local bus. The stream ID can be written in the fields that are assigned to the address of a cell. Alternatively, the stream ID fields can be part of a header in the payload.

Still alternatively, a stream ID may be associated with a space of addresses in a destination DSP. As such, the stream ID's associated entry in the remapping table may include the first address in the space of addresses and the number of consecutive addresses allocated to this stream. In addition, an entry can include a frame indication. The frame indication can inform the switch whether the relevant stream ID is associated with a space of inputting addresses per each destination logical module (for sending consecutive cells of the same frame of data) or with one inputting address per each destination logical module. The switch may be adapted to start with the first address when the first cell having the stream ID is received and than the destination of each consecutive cell with the same stream ID is incremented by the size of the previous cell a cyclic mode over the space of addresses. At the output of the switch consecutive cells that belong to the same logical stream and targeted to the same destination logical module may have other destination address. The other destination address can match a following address in a memory space in the receiver DSP that has been allocated to this logical stream. In such a way the continuity of a frame of the stream is kept at the receiver end, even though there is discontinuity in receiving the cells.

In an alternative embodiment, a source of transmitting data may use an offset value to support reconstructing of a stream. When a frame of data has to be transmitted in one or more cells, an offset value field can be added in parallel to the stream ID. The offset value of the first cell of a frame of data can be zero and each consecutive cell can be associated with a consecutive offset value. The relevant entry in the remapping table, which is associated with the stream ID, can include a destination address (inputting address at the destination) for each one or more targeted logical modules. Each destination address can represent an inputting address in which the first cell of the frame of data, which is associated with the stream ID, will be written for each one of the targeted logical modules.

The switch can be adapted to retrieve the appropriate entry in the remapping table associated with the stream ID and to get the list of the one or more destination addresses. Per each destination address in the list, the switch is adapted to calculate the address of the current cell by adding its offset value to the destination address. Then the payload is transmitted to the calculated destination address. The switch then retrieves the next address in the list and repeats the same steps for the next logical module in the list.

Changes occurring during a session can be managed because stream IDs can be associated to a session and a change during the session may necessitate transferring one or more relevant stream IDs from one or more sources of data to others. For example, during a videoconferencing session, a stream ID can be assigned to a decoded audio stream coming from a speaker conferee. This stream ID can be allocated to a decoder module that has been assigned to a conferee that is currently speaking. If a speaker is changed the decoder module of the old speaker may be muted and its associated stream ID can be transferred to another decoder module associated with another conferee. The remapping table and the destination modules are not aware of the change because only adaptation needed is muting the old modules and transferring the relevant stream IDs from the old ones to the new modules. Alternatively, the change in the association between stream IDs and destination modules can be done in the remapping table of the switch. The stream IDs that have been allocated to the decoded audio and decoded video streams of the old conferee are replaced by the stream IDs of the decoded audio and the decoded video streams of the new speaker. As yet another alternative, both methods, i.e., changing the stream ID or changing the remapping table, can be used, depending on the modification that is needed.

During initiation of the electronic device as well as initiation of a new session, each logical module may be assigned with an inputting address, or a space of consecutive inputting addresses. Those inputting addresses are used by the switch, as destination addresses, in order to push the appropriate cells toward the logical modules. In addition, each logical module is assigned with one or more streams ID. Each stream ID is associated with one of the streams or status or information that is created and sent by this logical module over the bus toward the switch. Consequently, a certain logical module may be associated with two or more stream IDs as well as two or more inputting addresses.

FIG. 1 is a simplified block diagram schematically illustrating relevant elements of an electronic device 100 having a plurality of DSPs 110a-c, 120a-c and 130a-c. The electronic device 100 can be adapted to perform a plurality of functions in which a computing device is needed. For example device 100 can be adapted to perform the functionality of an MCU for conducting one or more multipoint multimedia conferences. Among other modules, device 100 may comprise one or more groups of DSPs 110a-c, 120a-c and 130a-c; a switch 140, and a controller 150. Each group of DSPs 110a-c, 120a-c and 130a-c is connected over a bus 116, 126 and 136 respectively to the switch 140. Each DSP 110a-c, 120a-c and 130a-c can own or conduct in parallel one or more processes (logical modules) 113a-c, 123a-c and 133a-c respectively. Device 100 can be controlled by controller 150. Controller 150 may communicate with each internal element of device 100 via control bus 155. Alternatively, the controller 150 can be one of the DSPs 110a to 133c and the control bus 155 can be one of the buses 116 to 136 respectively. Device 100 can communicate with the external world via the external bus 145 for data and signaling and via the control bus 155 for control and status information. Three groups of DSPs 110a-c, 120a-c and 130a-c, three processes (logical modules) 113a-c, 123a-c and 133a-c at each DSP, three buses 116, 126 and 136, one controller 150 and one switch 140, are shown in FIG. 1 by way of example. It is understood that the disclosed system and method can be used with any number of modules etc.

Device 100 can be part of an MCU. For example, DSP 110a-c can be adapted to operate as network interface module and each process may be adapted to set a connection with an endpoint and transmit/receive compressed media and/or control from its associated endpoint, to process the received data according to the communication protocols and to receive/transmit the processed data to one or more other logical modules via bus 116 and switch 140. DSP group 120a-c can be video modules, each DSP 120a-c can have a plurality of video logical modules 123a-c for example video decoder logical modules, one or more video output modules, etc. DSP group 130a-c can be audio modules, each DSP having one or more audio logical modules 133a-c such as audio decoder logical modules, one or more audio output modules, etc.

Alternatively, device 100 can be a video unit of an MCU. In such a case each group of DSPs can handle the video of a conference. Another device 100, in the same MCU, can be an audio unit of the MCU. In an audio unit each group of DSPs can handle the audio of a conference. It will be appreciated by those skilled in the art that the present invention is not limited to certain applications or architecture.

Local buses 116, 126 & 136 are addressable buses. Each cell of data that is transferred over the bus has a header including a destination address and a payload with data. In some types of buses, the header and the payload may run over different physical wires. Exemplary addressable buses include but not limited to: Peripheral Component Interconnect (PCI) bus, PCI extended (PCI-X), Industry Standard Architecture bus (ISA), Serial or Parallel RapidIO, PCI express, etc. An exemplary external bus 145 can be similar to one of the local buses 116, 126 & 136, or may have a wider bandwidth than the local buses for supporting the plurality of DSPs. An exemplary external bus can be such as but not limited to: Serial or Parallel RapidIO, 10 Gb Ethernet (XAUI), etc. The external bus 145 can connect the device 100 via a backplane with other similar devices in the same apparatus and/or can connect the device 100 via an external port (not shown) of the apparatus and from there to other apparatuses over one or more networks (not shown). In the case of conducting a multimedia multipoint conference, the other apparatuses can be multimedia endpoints, for example.

Switch 140 receives data cells that are transmitted to and from each one of the processes (logical modules 113a to 133c) that are conducted over DSPs 110a to 130c respectively. Each logical module 113a to 133c sends its data cells using stream IDs. The switch translates the stream IDs into one or more destinations addresses (inputting addresses, writing addresses), replicates the cell's payload per each destination and distributes the payload to the one or more destinations that are associated with the stream ID. The destination can be to one or more process 113a to 133c. Cells that are using stream IDs that are associated with destination that reside outside of the device 100 are replicated and sent via the external bus 145. Alternatively (not shown in the drawing), an external bus 145 can be terminated in another switch. In such an embodiment replication of cells, which are sent over the external bus 145, is done at the other switch at the other end of the external bus 145. More information on the operation of switch 140 is depicted below in conjunction with FIGS. 2, 3 and 4.

Controller 150 can be a DSP, a microprocessor, a computer or any other computing device that can run software programs. The software programs can reside in a memory (not shown in the drawing). Controller 150 may receive the requirement for a certain session, for example a request to conduct a multimedia conference. According to the requirement of the session, controller 150 may allocate resources to the session. The resources can be one or more processes (logical module) 113a-133c that will be assigned to the session. Then, "inputting address" per each logical module is defined. The inputting address can be used by the switch 140 as a destination address of cells that are targeted toward the logical module. Controller 150 can define one or more logical streams that each logical module will deliver and associate a stream ID to each one of the logical streams.

Each one of the DSPs can be informed by the controller about the logical processes, the logical streams and stream IDs that have been assigned to this DSP. The switch is informed about the relation between each of the stream IDs and the one or more writing address ("inputting address") to where a cell with a certain stream ID has to be delivered. Accordingly a remapping table at the switch 140 is updated. At the end of this stage, the setting stage, device 100 is ready to start the required session.

While conducting the session, controller 150 may receive control information including status information, command or requests from external devices and/or from the involved DSPs, etc. Based on this control information, decisions are made whether a change in the setup of device 100 is needed. If a change is needed, controller 150 may define the changes and implement them on the relevant processes 113a to 133c and/or on the switch 140. More information on the operation of an exemplary controller 150 is presented below in conjunction with FIG. 3.

Figure 2:
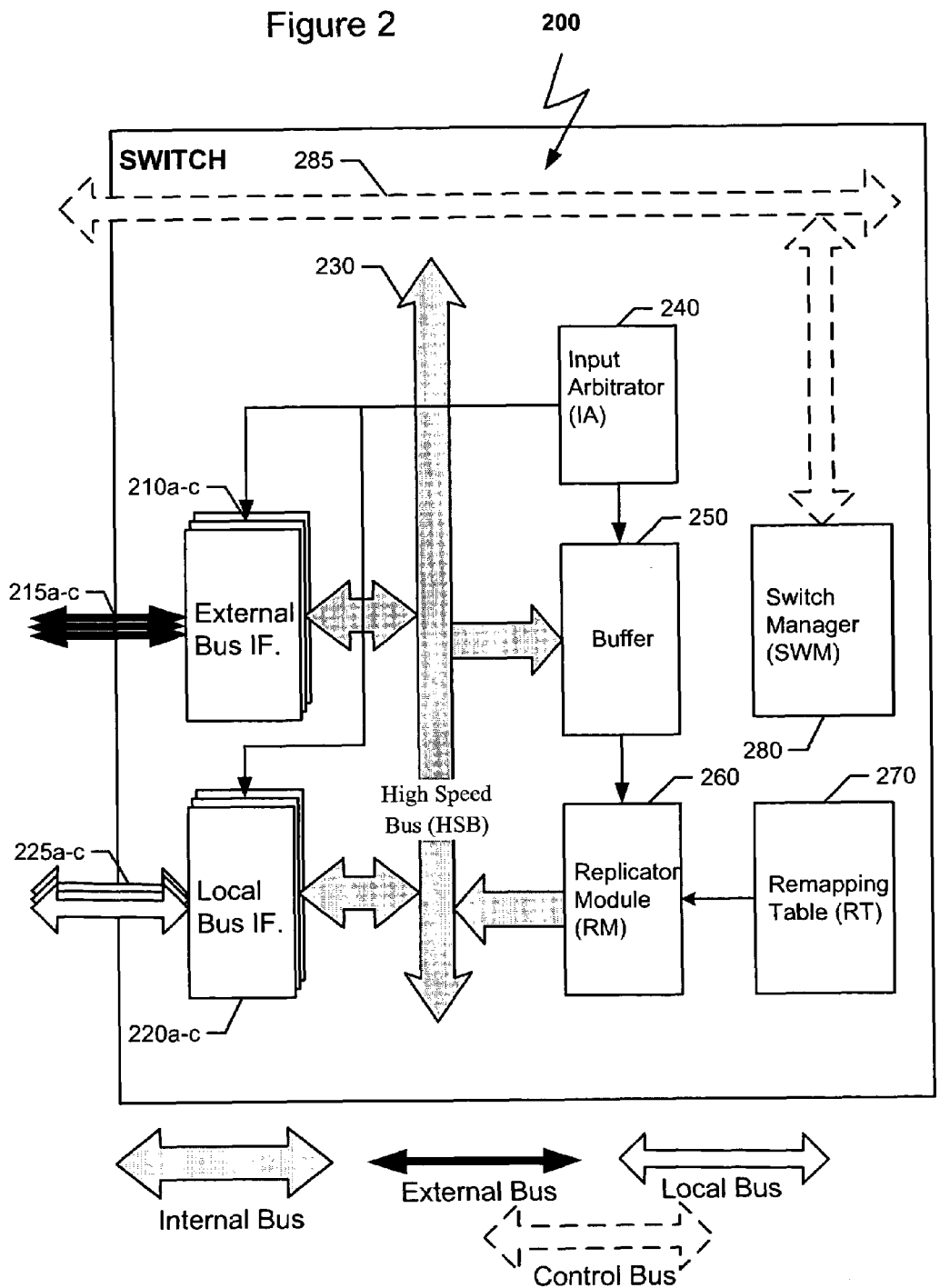
FIG. 2 schematically illustrates a simplified block diagram with relevant elements of an exemplary switch.

FIG. 2 schematically illustrates a simplified block diagram with relevant elements of an exemplary switch 200 that can be used in device 100 (FIG. 1). Switch 200 can be implemented by one or more ASIC, FPGA, or any other combination of programmable integrated circuit. Among other elements switch 200 can include one or more external bus interface modules 210a-c, one per each external bus 215a-c; one or more local bus interface modules 220a-c, one per each local bus 225a-c; an input arbitrator (IA) 240; a buffer module 250; a replicator module (RM) 260; a remapping table (RT) 270 and a switch manager (SWM) 280. In addition to the above modules switch 200 can include a high speed bus (HSB) 230 and a control bus 285. Controller 150 (FIG. 1) can be implemented by one of the DSPs 110a to 130c (FIG. 1) and control bus 155 can be one of the buses 116, 126 or 136 (FIG. 1). In such an embodiment control bus 285 is replaced by a connection between SWM 280 and RM 260 (not shown in the drawings).

Exemplary bus IF modules 210a-c and 220a-c (external or local bus IF modules) can include transceivers that are adapted to the type of the bus 215a-c and 225a-c, an asynchronous FIFO for matching the external or local buses and the internal HSB 230. In addition IF module 210a-c and/or 220a-c may include a protocol converter for translating between the communication protocols that are used in each side of the IF module. HSB 230 is a fast and wide bus that has to carry the data transportation of the entire device 100 (FIG. 1).

IA 240 can scan the FIFO of each one of the IF nodules 210a-c and/or 220a-c looking for a received cell to be processed and distributed by switch 200. IA 240 may use round robin arbitration method for scanning the IF module. Alternatively, other arbitration methods can be used. IA 240 manages the transferring of cells over the HSB 230 toward the buffer 250. Buffer 250 can match between the HSB 230 and the replicator 260. In some exemplary embodiments (such as shown in FIG. 2) IA 240 may also control the access of RM 260 to the HSB 230.

RM 260 is adapted to retrieve a next cell from buffer 250, process it, and decode the stream ID that is associated with the cell. The stream ID can be embedded within the header of the cell in one or more fields of an address section. Alternatively, the stream ID can be embedded within one of the headers of the payload. The stream ID is used to access the remapping table 270 and to retrieve an entry that is associated with the stream ID. Each entry in the remapping table includes a list of one or more inputting address of logical modules 113a to 133c (FIG. 1) to which the cell can be transmitted as well as a frame indication. The frame indication can inform replicator 260 whether the relevant stream ID (entry) is associated with a space of inputting addresses per each destination logical module. The space of inputting addresses can be used for sending consecutive cells of the same data frame. If the cell is one of a plurality of cells that belongs to a frame of data, the frame indication is set to true and an offset value can be added to the inputting address. The offset value reflects the location of the current cell compared to the beginning of the frame. The source, i.e., the logical module which sent the cell, can add the offset value in the appropriate fields in association with the stream ID. The frame indication may be sent with the cell and is not stored in the remapping table 270. Alternatively, the replicator 260 and RT 270 manage the offset value. Alternatively, both methods can be used.

Per each inputting address in the list, which represents a destination logical module, the payload is replicated. In addition, a destination address that is equal to the relevant inputting address (from the list) plus the offset, which is relevant to the location of the current cell in the frame, are assigned to the replicated payload in order to create a replicated cell. The replicated cell is transmitted over HSB 230 via the appropriate IF 210a-c or 220a-c to its final destination to one of the processes 113a to 133c (FIG. 1) or to an external device.

Remapping table 270 is a table that has a plurality of entries. Each entry is associated with a stream ID and includes a list of inputting addresses to which a cell having the associated stream ID is to be delivered. An entry may include a frame indication and a current offset value that will be used for the next cell as well as the space of addresses that are allocated to this stream ID. Alternatively, an entry includes only the inputting addresses without the offset value. Alternatively, the RT 270 may be composed of two or more tables.

SWM 280 is used during setup mode to load the remapping table with the appropriate stream IDs with or without offset values. During a session the SWM 280 updates the RT 270 according to the required changes in the session. Information and instructions are given by the controller 150 (FIG. 1) via control bus 155 and internal control bus 285. In an embodiment in which controller 150 is one of the DSPs 110a-130c and control bus 155 is one of the buses 116 to 136, SWM 280 communicates with controller 150 via RM 280 (not shown in the drawings). More information on the operation of switch 200 is provided below in conjunction with FIG. 4.

Figure 3:
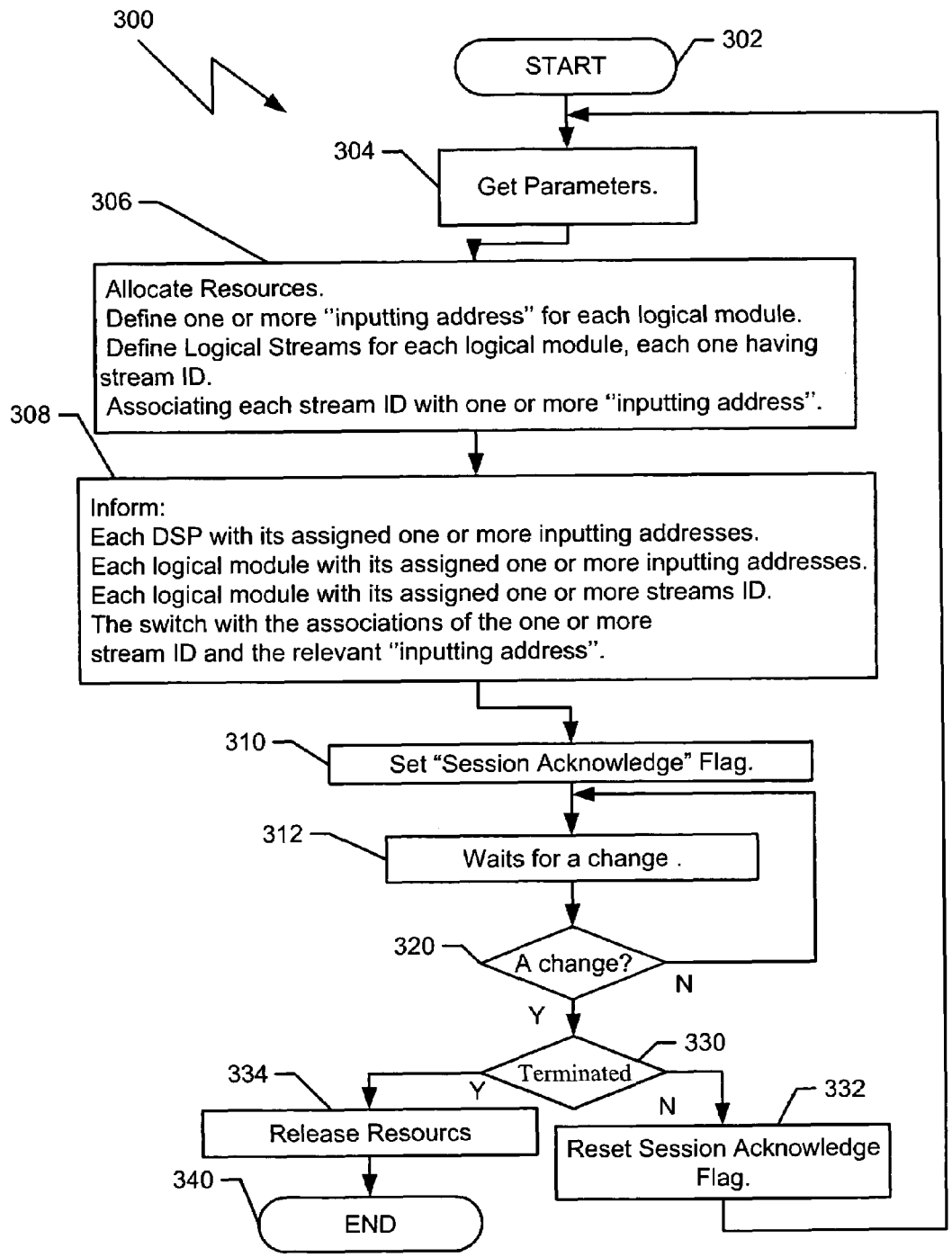
FIG. 3 illustrates a flowchart showing relevant steps of an exemplary process for managing internal communication in the electronic device of FIG. 1.

FIG. 3 is a flowchart illustrating relevant elements of an exemplary embodiment of a process 300 for establishing and controlling communication between internal elements of device 100 (FIG. 1) during an application session. For clarity and simplicity, 100 is disclosed as implemented by controller 150 (FIG. 1) of an MCU for conducting a multipoint multimedia conference session. Different steps of process 300 can be modified in order to be used by other controllers 150 installed in other types of devices 100 (FIG. 1). The process 300 may be initiated 302 when the starting time of a conference arrives for a reserved conference, or upon starting an ad-hoc conference.

Upon initiation, session parameters are collected 304 via control bus 155 (FIG. 1). The parameters can include information such as conference profile, dial out numbers or IP address of each one of the endpoints involved in the conference and their associated MCU, etc. The conference profile can include information such as criteria for selecting one or more presented endpoints (i.e., the loudest one or more speaker or one or more appointed forced presented endpoints whose image will be displayed independently of their audio energy, etc.), a requested one or more layout, whether certain endpoints can have certain priorities, the duration of the conference, bit rate, etc. The collected information can be stored at a memory (not shown) that is associated with controller 150 (FIG. 1).

Based on the received and stored information, controller 150 may start a setup step 306 in which the controller 150 can determine what types of resources are required for handling the session. The resources can include computing resources, logical modules 113a to 133c in the different DSPs 110a to 130c (FIG. 1) and/or bandwidth resources over selected one or more buses 116 to 136. For the multipoint conference session that is used as an exemplary session conducted by device 100, exemplary logical modules can include a plurality of network interface modules, video input modules, and/or video output modules, each being associated with an endpoint, etc.

Common functionalities of the various components of an MCU are known in the art, and are not described in exhaustive detail herein. However, the reader desiring a better understanding of such details may wish to consult U.S. patent application Ser. No. 10/144,561; U.S. Pat. No. 6,300,973; U.S. patent application Ser. Nos. 09/708,898; 10/072,081 and 09/852,438; U.S. Patent Application Publication No. 2003/0103468; PCT international published patent applications WO02/060126 and WO2005/004481; and International Application Serial No. PCT/IL01/00757; the content of which are incorporated herein by reference in their entireties. The present disclosure elaborates the description of the operation and controlling of the internal communication of a MCU as an exemplary device 100.

One or more categories of inputting address can be assigned 306 to each allocated logical module. Each category of inputting address can be associated with a category of communication received by the logical module. For example, a video input logical module may receive two categories of communications and therefore it may be associated with two categories of inputting addresses. The first category can be associated with received commands and controls and the second category can be associated with a received compressed video stream. The compressed video stream is sent from a network interface module associated with the same endpoint as the logical input video module.

Each category of inputting address can include a single inputting address or a space of consecutive inputting addresses, depending on the needs of its associated category of communication. In some cases the inputting addresses represent an address space in a memory of a destination DSP. In other cases the inputting addresses represent a mail box or a messaging unit at a destination DSP. The space of consecutive inputting addresses can be used for transferring consecutive cells of a frame of data sent in two or more consecutive cells over the internal buses 116 to 136. The first address of the space of consecutive inputting addresses can be used for receiving the first cell of a frame. The inputting addresses are used by the switch 140 (FIG. 1), as destination addresses, in order to push the appropriate cells toward the logical modules. In some exemplary embodiments, for example when the local buses 116 to 136 are PCI buses, the inputting addresses can be address within the internal or external memory of the relevant DSP 110a to 130c.

Another exemplary logical module can be a video output module. An exemplary video output module can include a video mixer (builder) and a video encoder. The logical module may have two or more spaces of inputting addresses that belong to the second category, having a space of consecutive inputting addresses. The number of spaces can match the number of conferees that can be displayed in the required layout. Each space of inputting addresses can be associated with receiving cells of decoded video stream coming from a video input module associated with a conferee who's image is currently displayed (a speaker conferee) on the screen of the endpoint, which is associated with this video output logical module. The source of this inputting address can be replaced during the session when the speaker is replaced. A logical module may have multiple inputting addresses for receiving cells of data.

During the setup stage 306 logical streams can be defined and be associated with each logical module. A logical stream can represent a category of output data stream that is created and/or delivered by/via the logical module. An exemplary logical stream is a decoded audio stream coming from an audio input module. Some exemplary logical modules may be associated with a plurality of logical streams. For example, a network interface logical module associated with an endpoint that is using a communication standard such as H.320 or H.324 may include a demultiplexer unit, which receives a single multimedia stream and delivers four logical streams: a compressed video stream, a compressed audio stream, a data stream and a control/signaling stream. In addition to the media streams, a network interface module may deliver status and information streams to controller 150 (FIG. 1). On the other direction, from the MCU toward the associated endpoint, a network interface module may deliver a MUX multimedia stream and a signaling/control stream. As is apparent, a logical module can be associated with a plurality of logical streams. A stream ID is assigned to each logical stream.

At the end of the setup step 306 a section of the remapping table associated with the new session is created. The section may include an entry per each stream ID. Each entry can include one or more inputting addresses (destination addresses) that have been allocated to logical modules to which the stream is to be distributed (multicast). In the case that the inputting addresses is a space of consecutive addresses, each entry can include a frame indication and a base address to where a first cell of a frame can be written in each destination logical module. The relevant entry in the remapping table may include a field for an offset value that can be incremented per each consecutive cell in the frame. The offset value is added to the base address to be used as the inputting address of the current cell.

Alternatively, each entry may include the base address per each destination logical module, while the offset value and the frame indication are delivered with each received cell in an appropriate field, for example in the header of the cell. In a still alternate embodiment, each entry may include the steam indication and size of the allocated space of addresses. In such an embodiment, the switch can be adapted to calculate the writing address per each consecutive received cell and to restart from the base address when the offset reaches the value of the allocated space of addresses. For example, an entry in the section of the remapping table that is associated with a stream ID that is assigned to a decoded video stream coming from a video input module associated with a speaker's endpoint may include the inputting addresses (the base address) of each of the other one or more output logical modules. In some exemplary embodiments the entry may include also an offset value for the next received cell.

After setting 306 the required resources, streams, and the relations between them the controller 150 (FIG. 1) informs 308 each DSP 110a to 130c (FIG. 1) involved in the session about the new set up. Software programs for implementing the one or more logical modules 113a to 133c involved in the session can be loaded into the relevant DSPs. Then each logical module is informed about the stream IDs allocated to its output streams, as well as the inputting addresses in which received data and or control is stored. After or in parallel to informing each involved logical module, the switch can be loaded with the section of the remapping table prepared in step 306. At this point, exemplary device 100 can be ready to start the new session and a flag "session acknowledge" can be set 310 to TRUE and method 300 may wait for a change in the session 312 & 320.

Many of changes can occur during a session. For example, in a multimedia conference session, a speaker conferee may be replaced by another conferee; a new conferee can join the session; a conferee may terminate its participating in the session; the session can be terminated; etc. If 320 there is a change and if 330 the change is terminating the session, then controller 150 may release 334 all the resources that have been allocated to this session. The resources can include computing resources such as logical modules 113a to 133c; communication resources such as stream IDs, inputting addresses, and entries in the remapping table, etc. Then method 300 is terminated 340.

If 330 the session is not terminated, then the "session acknowledge" flag can be reset 332, indicating that the device 100 is in a transit period and method 300 can return to step 304 getting the parameters the change. Method 300 may implement the change of the relevant logical modules for adapting them to the new situation. In such a case steps 306 & 308 may include functions that are needed for handling a change in the session such as muting certain logical modules, changing entries in the remapping table, transferring stream IDs from one logical module to the other, etc. For example if a speaker is replaced, then the input video, audio, and data logical modules assigned to the old speaker are muted. The stream IDs that have been allocated to those input modules can be transferred to the input video, audio and data logical modules, respectively, of the new speaker and the flag "session acknowledge" can be set 310 to true.

Alternatively, the change can be implemented in the remapping table 270 of switch 200 (FIG. 2). The SWM 280 may be instructed to search the entries in the remapping table that are associated with the one or more stream IDs that belong to the input video, audio, and data logical modules that have been assigned to the old speaker. At each found entry the stream ID is replaced with the respectively input video, audio and data logical modules assigned to the new speaker. In parallel or before replacing the stream IDs, the input video, audio and data logical modules that have been assigned to the old speaker can be muted.

Alternatively, instead of modifying the relevant logical modules in response to the change, method 300 may refer to the old session with the changes as a new session and then may execute steps 306 and 308 according to the needs of the new session. Alternatively, a combination of those methods for implementing a change can be used. The decision of which method to use can depend on the nature of the change. For example, in case of replacing a speaker, the first method can be used. In case of adding an additional conferee to the conference, the second method can be used, etc. After adapting the switch to the change, the flag can be set 310 and method 300 may wait 312 & 320 for the next change. Method 300 may continue and run as long as the relevant session is active.

Figure 4:
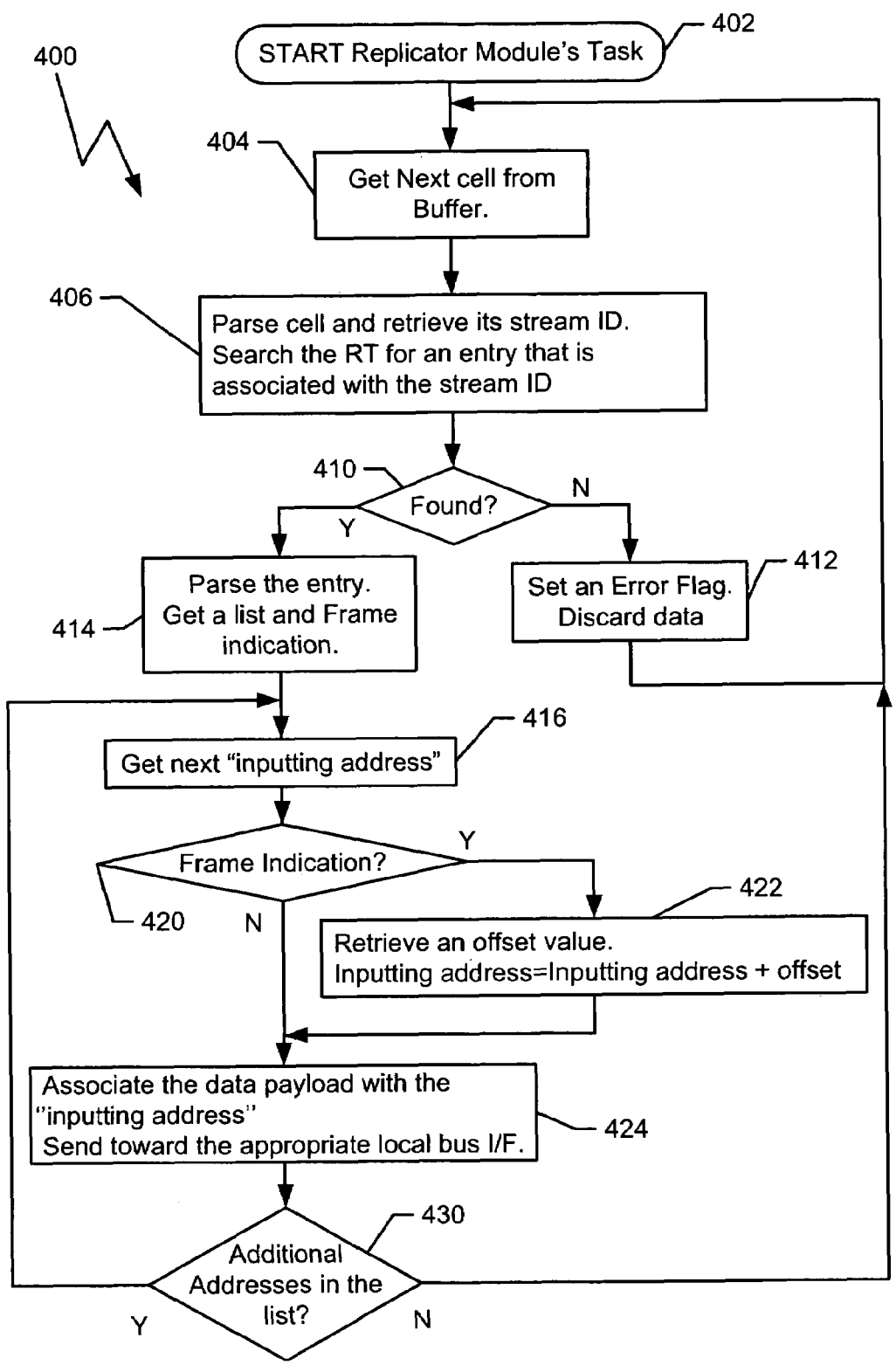
FIG. 4 illustrates a flowchart showing relevant steps of an exemplary process for managing internal communication in the switch of FIG. 2.

FIG. 4 is a flowchart showing relevant steps of an exemplary process 400 used by a replicator module (RM) 260 (FIG. 2). For clarity and simplicity, process 400 is explained as it would be implemented at an MCU. Different steps of process 400 or terms in the following description can be modified to be used by other electronic devices 100 (FIG. 1). Process 400 can be initiated 402 by the control module 150 (FIG. 1) in parallel to the first setting the flag "Session acknowledge" step 310 (FIG. 3).

After initiation, a loop is started at step 404. The loop can run as long as the device 100 (FIG. 1) is active. At step 404 the next cell in the buffer 250 (FIG. 2) is retrieved. The cell is parsed 406 and the stream ID is retrieved. The Stream ID can be located at the header of the cell, in some of the fields that are allocated to the address, for example. Alternatively, the stream ID can be retrieved from the appropriate field in one of the headers that belong to the payload. The remapping table 270 (FIG. 2) is searched for an entry that is associated with the stream ID.

A decision is made 410 whether an entry has been found. If not, an error flag may be set 412 indicating that an illegal cell was received. In parallel the cell can be discarded or saved in an "Illegal Buffer" for further inspection (not shown) and method 400 returns to step 404 looking for the next cell in the buffer 250. If 410 an entry is found in the remapping table the entry is parsed 414 and a list of one or more "inputting addresses" and a frame indication, if it exist, are retrieved. In one embodiment the frame indication can be retrieved from the relevant entry. Alternatively, the frame indication can be retrieved from the cell itself as a field that can be associated with the stream ID, for example. The frame indication indicates whether the cell is one of a plurality of cells that belong to a frame of data. A loop is initiated from step 416 to 430 to cover each of the inputting addresses that exist in the list.

At step 416 the next inputting address in the list is retrieved. Then a decision is made 420 whether the frame indication is true. The frame indication can be stored as one of the fields of the relevant entry. Alternatively, the frame indication can be associated with the cell, for example. If 420 the frame indication is false, which means that the cell is an individual cell, method 400 proceeds to step 424. If 420 the frame indication is true, which indicates that the relevant cell is one of a plurality of consecutive cells constructing a frame of data, then method 400 proceed to step 422.

At step 422 an offset value is defined. The offset value represents the location of the current cell in a frame of data. In one case the location in the frame can be in spatial domain in another case or type of data the offset can be in the time domain, for example. The offset value can define the distance (in memory units, number of bytes, e.g.) of the current cell from the beginning of the frame of data that the cell is a part of. Usually in the spatial domain, a zero offset value may indicate the beginning of a video data frame; it can be the data that is relevant to the pixel in the top left corner of the screen, for example. Using the offset values during storing the data of the cell, at each one of the destination logical modules, preserves the spatial order of the data independent on the arrival time. The offset can be calculated by the source of the data, e.g., the logical module that delivered the relevant cell. The offset value is added to the cell. The offset value can be written in one or more fields that can be associated with the stream ID, for example, or one of the fields in one of the headers of the payload, for example.

In another case the location in the frame can be in time domain. For example, in an audio stream continuity in time is necessary. In such a case the offset preserves the order of storing the payload of the received cell according to the order in which the stream is originally created by the source of the stream independent of the order the cells are received. In such a case the offset value can run in a cyclic mode within a space of memory addresses. The offset value can be stored in the relevant entry of the remapping table. In such embodiment the offset value is retrieved from the relevant entry. After defining the offset value, a new inputting address is calculated for the current cell in the current destination logical module. The new inputting address is the one that is retrieved from the list plus the offset value. In exemplary embodiments, in which the offset is stored in the relevant entry, the old value of the offset is increased by the size of the cell and the new value of the offset is stored instead of the old offset value in the relevant entry. If the current cell is the last one in the frame, then an indication of the last cell in the frame can be added to the cell as one of the fields associated with the stream ID or the header. In such a case the new offset value can be reset in order to prepare it to the next cell. Alternatively, the offset value can be changed within a space of memory addresses that was allocated to this stream ID. The volume of this space can be written in one of the fields of the relevant entry. Any one or any combination of the above depicted offset methods can be used by different exemplary embodiment.

After calculating the new value for the inputting address and the new value of the offset, method 400 proceeds to step 424, in which the payload of the received frame is associated with the inputting address to create a replication of the original cell. The replicated cell is delivered toward its destination using the inputting address. The replication step may include additional modifications that are required by the communication protocol used over the bus of device 100 (FIG. 1). For example, a new checksum can be calculated in order to match the new destination address, etc. After sending the replicated cell a decision is made 430 whether the current inputting address is the last one in the list. If not, method 400 returns to step 416 for retrieving from the list, the next inputting address of the next destination. If the inputting address is the last one in the list, then method 400 returns to step 404 and retrieves the next cell from buffer 250 (FIG. 2).

In the present disclosure, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware.

It will be appreciated that the above described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims.

What is claimed is:

1. A method of delivering at least one data stream comprising a plurality of data cells from a logical module to one or more destinations via one or more addressable buses, the method comprising:
    assigning a stream identifier to the at least one data stream;
    associating the data cells with the stream identifier;
    delivering the data cells toward a switch over one of the addressable buses;
    identifying, at the switch, an inputting address for each one or more destinations associated with each stream identifier, and
    for each destination, replicating a payload of the data cells and delivering the replicated payload to the inputting address of the destination via one or more addressable buses.

2. The method of claim 1, further comprising modifying the identified inputting address wherein delivering the replicated payload is toward the modified inputting address.

3. The method of claim 2, wherein the modification to the inputting address reflects the location of the cell within a frame of data.

4. The method of claim 2, wherein the modification is done by adding an offset value to the inputting address.

5. The method of claim 1, wherein identifying one or more destinations associated with a stream identifier comprises retrieving an entry associated with the stream identifier from a remapping table.

6. The method of claim 1, wherein, wherein the stream identifier further comprises an indication that a given cell is one of a stream of consecutive cells constituting a frame of data.

7. The method of claim 1, wherein the destination associated with the stream identifier comprises a space of inputting addresses for receiving the stream of consecutive cells constituting a frame of data.

8. The method of claim 1, further comprising updating the remapping table by changing the destination addresses associated with the stream identifier.

9. The method of claim 1, wherein at least one addressable bus is a PCI bus.

10. The method of claim 1, wherein the logical module is a digital signal processor (DSP).

11. The method of claim 1, wherein the logical module is process running in a DSP.

12. The method of claim 10, wherein the DSP is part of a multipoint control unit (MCU).

13. The method of claim 1, wherein data stream comprises video or audio data.

14. The method of claim 1, wherein at least one destination receives cells associated with two or more different stream identifiers.

15. The method of claim 1, wherein at least one destination is associated with two or more inputting addresses.

16. The method of claim 1, wherein the inputting address is a space of memory addresses that is associated with the destination logical module.

17. A switch for delivering a data stream comprising a plurality of data cells from a logical module to one or more destinations via one or more addressable buses, wherein the data stream is associated with a stream identifier, the switch comprising:
    a remapping table comprising an entry corresponding to the stream identifier, the entry comprising a list of an inputting address for each of the one or more destinations associated with the stream identifier; and
    a replicator module adapted to:
        modify the inputting address to reflect the location of the cell within a frame of data;
        replicate a payload of the data cells;
        and deliver the replicated payload to the modified inputting address of the destination via the one or more addressable busses.

18. A MCU comprising a switch adapted to deliver a data stream comprising a plurality of data cells from a digital signal processor (DSP) to one or more destinations via one or more addressable buses, the switch comprising a remapping table adapted to recognize a stream identifier associated with the data stream and identify one or more destination addresses associated with the stream identifier; and a replicator module adapted to modify the inputting address to reflect the location of the cell within a frame of data, replicate a payload of the data cells and deliver the replicated payload to the modified destination addresses via the one or more addressable busses.

19. The MCU of claim 18, wherein the remapping table comprises an entry corresponding to the stream identifier, the entry comprising a list of one or more destination addresses associated with the stream identifier.

20. The MCU of claim 19, wherein the remapping table is adapted to be updated during a videoconference by changing one or more destination addresses associated with the stream identifier.

21. The MCU of claim 20, wherein the updating is in response to changing speakers during a video conference.

* * * * *

UNITED STATES PATENT AND TRADEMARK OFFICE
CERTIFICATE OF CORRECTION

PATENT NO.       : 7,581,038 B1
APPLICATION NO.  : 11/378797
DATED            : August 25, 2009
INVENTOR(S)      : Lieberman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 418 days.

Signed and Sealed this

Fourteenth Day of September, 2010

David J. Kappos
*Director of the United States Patent and Trademark Office*